United States Patent [19]
Hodgetts

[11] Patent Number: 4,749,325
[45] Date of Patent: Jun. 7, 1988

[54] METHOD AND APPARATUS FOR LOADING TRUCKS

[75] Inventor: Graham L. Hodgetts, Mars, Pa.

[73] Assignee: Rolflor Industries, Inc., Evans City, Pa.

[21] Appl. No.: 906,291

[22] Filed: Sep. 11, 1986

[51] Int. Cl.⁴ .............................................. B60P 1/38
[52] U.S. Cl. ................................. 414/395; 242/68; 414/527; 414/393
[58] Field of Search ............. 414/373, 390, 392, 393, 414/395, 396, 398, 400, 403, 416, 417, 679, 585, 491, 492, 494, 497, 527, 537, 538; 242/68

[56] References Cited

U.S. PATENT DOCUMENTS

| | | | |
|---|---|---|---|
| 1,329,392 | 2/1920 | Ford | 414/393 X |
| 3,186,566 | 6/1965 | Spinanger et al. | 414/395 |
| 3,704,798 | 12/1972 | Carpenture, Jr. et al. | 414/527 |
| 4,339,884 | 7/1982 | Andrews | 414/527 X |
| 4,457,424 | 7/1984 | Wuensch | 414/395 X |

FOREIGN PATENT DOCUMENTS 2385641 12/1978 France .................. 414/497

Primary Examiner—Frank E. Werner
Attorney, Agent, or Firm—Fleit, Jacobson, Cohn & Price

[57] ABSTRACT

Method and apparatus for truck loading using a conveyor to advance a load into a truck backed-up to a loading dock. A special sheet or belt is laid over the bed of the truck and anchored at the edge adjacent the rear end of the truck bed. The sheet has special frictional characteristics. The load is pushed into the truck over the special sheet, the load in the truck is held in position and the special sheet is freed of the anchors and is slipped out from between the load and the truck bed.

7 Claims, 2 Drawing Sheets

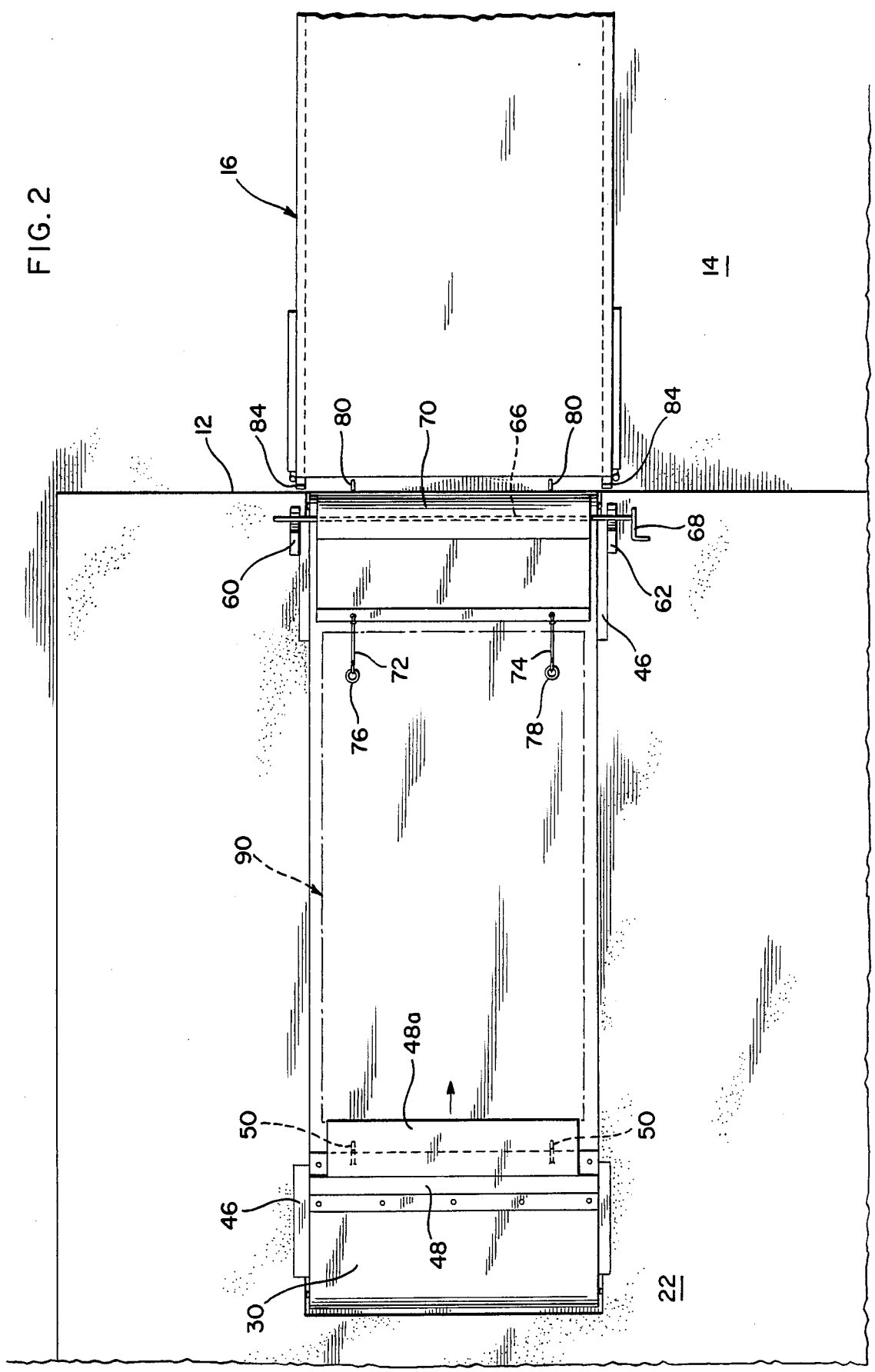

METHOD AND APPARATUS FOR LOADING TRUCKS

BACKGROUND OF INVENTION

1. Field of the Invention

The present invention relates to a novel method and apparatus for loading trucks, especially of the common carrier type.

2. Description of the Prior Art

Prior to the advent of the present invention several systems have been proposed whereby trucks may be loaded automatically. For example, special conveyor systems in conjunction with powered winding rolls have been installed in a loading dock and cooperate with like conveyor systems powered by winding rolls which are installed in a truck or truck trailer. For ease of expression the term "truck" as used herein refers to either a truck with a unitary load carry body or a trailer truck.

The load to be loaded into the truck is deposited on a conveyor on the dock and is advanced into the rear open end of a truck by means of the conveyor and powered winding rolls. The conveyor system within the truck receives the load as it passes through the opening at the rear of the truck and continues to advance the load into the truck to the full extent. Such loading systems have the principal disadvantage that loads cannot be loaded into conventional trucks not provided with the conveyor loading system, that is, a conveyor belt within the truck that runs along the floor of the truck and which is powered by winding rolls at the front and rear of the load carrying portion of the truck.

SUMMARY OF THE INVENTION

Accordingly, there still remains a need for a simple loading system that can be used in conjunction with conventional or common carrier trucks not provided with any special built-in conveyor means or arrangements to assist in loading.

Therefore, an object of the present invention is to provide a novel method and apparatus for loading trucks especially conventional or common carrier trucks not outfitted with any special built-in conveyor system which method and apparatus will operate easily, simply, expediently and economically.

The foregoing is accomplished by means of the present invention by providing on a loading dock a conveyor system consisting of a conveyor floor or belt which is powered by winding rolls at each end, one end being located adjacent the edge of the loading dock against which a truck backs up to. The other end of the conveyor floor or belt is located spaced remote from the edge of the loading dock so that a conveying surface is provided upon which to deposit a load to be loaded into a truck. A special slip floor or belt is provided also at the loading edge of the loading dock. The slip floor is a flexible sheet of material of preselected frictional characteristics so that a load will easily slip over the flexible sheet and the sheet will easily slip from between a load and the truck bed when withdrawn. The slip floor is arranged to be suitably anchored at the loading edge of the dock while being rolled into position on the floor or bed of the truck. The load to be loaded is deposited on a portion of the conveying surface of the conveyor belt riding on the loading dock and the load is pushed toward the open end of the truck which is backed up to the edge of the loading dock by means of a pusher bulkhead fixed to the conveyor belt. As the load advances beyond the edge of the loading dock, the load enters into the truck body and is received on the slip floor sliding over the slip floor while being pushed by the pusher bulkhead. A single load or successive loads are pushed into the truck until fully loaded. At this time the anchors for the slip floor are detached and they are now connected to hooks fastened or secured to the conveyor floor or belt which has been used on the loading dock to advance the load into the truck. Retraction of the conveyor floor or belt away from the truck by means of the powered winding rolls draws the slip floor out from underneath the load which has been loaded into or deposited into the truck body. During this action, a suitable gate, withdrawal preventer means or stop means is provided on the rear of the truck to prevent the load from withdrawing or unloading during removal of the slip floor. In addition to the foregoing, a mandrel is provided upon which to wind the slip floor into a rolled position at the edge of the loading dock when not in use.

As a modification to the present invention, it is also contemplated that the slip floor can be left in position in the truck together with the load. When the truck reaches its destination and is to be unloaded, the slip floor is attached to a suitable winch or other power device for pulling the load out off the truck while still on the slip floor.

BRIEF DESCRIPTION OF THE DRAWINGS

Other and further objects of the present invention will be apparent from the following detailed description of the present invention when taken in conjunction with the drawings in which:

FIG. 2 is a top plan view of the showing of FIG. 1.

DETAILED DESCRIPTION OF THE PREFERRED EMBODIMENT

Figure 1:
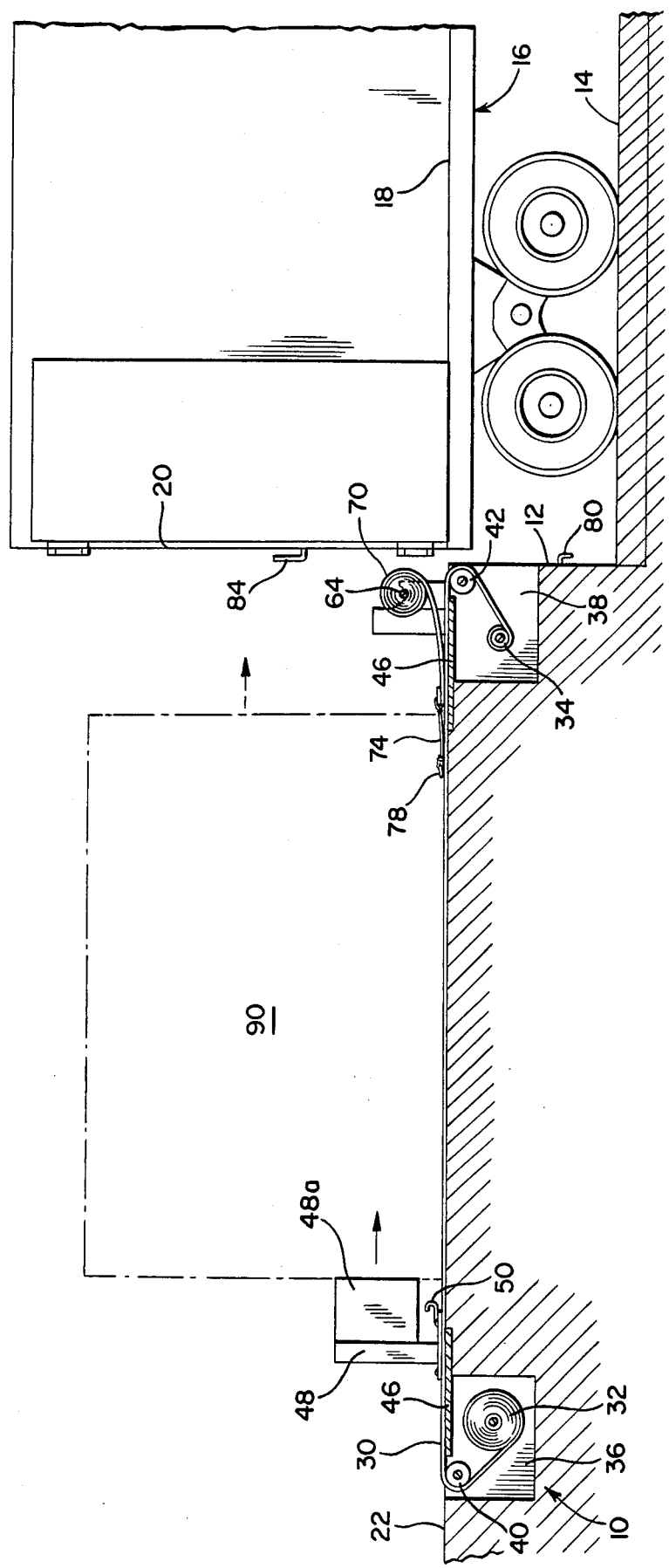
FIG. 1 is a side elevation showing a common carrier type truck (truck trailer) backed up to a loading dock provided with the apparatus of the present invention which is used for carrying out the method of the present invention.

The preferred embodiment of the present invention is shown in FIGS. 1 and 2 and consists of a loading dock 10 comprised of a conventional concrete structure that functions for this purpose. The front edge of the loading dock is identified by the reference numeral 12. The loading dock 10 stands raised or projecting vertically from or above a roadway or driveway 14. Customarily the top surface of the loading dock is between 2 and 4 feet above the driveway 14. The height of the loading dock is such that a conventional common carrier truck, shown by the reference numeral 16, has its bed 18 at the same elevation as the horizontal surface 22 of the loading dock 10.

The rear end 20 of the truck 16 is provided with doors or gates so that the rear end can be totally opened and exposed for the purpose of receiving a load and yet appropriately secured.

On the loading dock 10 is arranged an elongated conveyor floor or belt 30 which is reeled onto a powered winding roll 32 at the end of the belt remote from the edge of the loading dock and onto a powered winding roll 34 at the edge of the loading dock. The powered winding rolls 32 and 34 are mounted in recesses 36 and 38, respectively, formed in the upper surface 22 of the loading dock 10. Idler rollers 40 and 42 serve to bring the conveyor belt 30 to the proper elevation and attitude onto the floor 22 of the loading dock. Steel plates 44 and 46 serve to provide support for the conveyor belt 30 over the recesses 36 and 38 that are formed in the upper surface 22 of the loading dock. In addition, a pusher bulkhead 48 is attached or fixed or secured to the conveyor belt 30 with the pusher section 48a spaced slightly above the conveyor belt 30. Hooks 50 are attached or fixed or secured to the conveyor belt 30 in the space beneath the pusher section 48a of the pusher bulkheads 48. Two such hooks 50 are provided spaced apart laterally across the conveyor belt 30.

A pair of spaced stanchions 60 and 62 are mounted at the edge of the loading dock. Notches 64 on stanchions 60 and 62 serve the purpose of receiving opposite ends of a mandrel 66. The stanchions 60 and 62 are located laterally outside of the conveyor belt 30 and therefore, do not interfere with its movement as it travels back and forth on the powered winding rolls 32 and 34. The mandrel 66 is provided at one end with an L-shaped handle 68 for the purpose of manually operating or rotating the mandrel. Normally wound around the mandrel into a roll is a slip floor 70 the free end of which is provided with a pair of laterally spaced cables 72, 74 terminating in rings 76 and 78. The cables 72 and 74 are firmly secured or fixed to the free edge of the slip floor 70. The slip floor 70 is about 2 mm thick and is of a special material. The preferred belt is a Habasit VT 144, a trade name of Habasit AG of Basel, Switzerland, which has the requisite properties concerning friction and slippage on both of its surfaces. The maximum coefficient of friction of the two surfaces is about 0.3 or lower and preferably about 0.2 or lower. The front edge or vertical surface 12 of the loading dock is provided with a pairs of anchors or hooks 80, 82 which coact with the rings 76 and 78 secured at the free ends of the cables 72 and 74.

The operation of the apparatus of the present invention is as follows. First the mandrel 66 is withdrawn from the rolled slip floor 70. The rolled slip floor 70 is then unrolled onto the bed 18 of the truck through its rear opening and extends all the way from the rear edge of the truck body to the forward edge of the truck bed. Next, the front edge of the slip floor 70 is dropped between the rear of the truck and the loading dock and the rings 76 and 78 are slipped over and attached or hooked to the anchors 80 and 82, respectively. Next a load, shown in phantom and identified by the reference numeral 90 is placed onto the conveyor belt 30 in a position to be advanced into the truck through its open rear end. The conveyor belt 30 is then operated by winding up the powered roll 34 while allowing the roll 32 to pay out. The pusher bulkhead 48 is advanced and comes into contact with the load to be loaded into the truck. As the conveyor belt 30 is taken up by the powered roll 34, the load is advanced into the truck body. During this activity, the load is received onto the slip floor 70 which now extends over the bed of the truck. Due to the enhanced frictional characteristics of the slip floor, the force required to advance or push the load into the truck body is low.

Successive loads are advanced into the truck until the truck is completely loaded at which time the bulkhead 48 is positioned for the rings 76, 78 to be attached to the hooks 50. This is accomplished by withdrawing the conveyor 30 slightly from the truck through powering of roll 32 and paying out of roll 34 until the bulkhead is located in the appropriate position. Now the rings are detached from the anchors 80 and 82 and connected to the hooks 50. The slip floor 70 is now ready to be withdrawn from the truck and from beneath the load now in the truck.

In order to accomplish this the back of the truck is gated with a load withdrawal preventer beam which is placed across and mounted, fixed or secured to the back of the truck or otherwise held in a stationary or locked position to prevent the load from withdrawing while the slip floor is being removed. This can be accomplished by any conventional means, for example, a beam can be placed across the back of the truck and held or set in appropriate brackets 84 to hold the load in position while the slip floor is being removed. Next the conveyor 30, bulkhead 48 and hooks 50 are retracted from the edge of the dock by operating or powering winding roll 32 and paying out winding roll 34. Since the rings 76 and 78 are now attached to the hooks 50, as the conveyor bulkhead and hooks 50 move away from the edge 12 of the loading dock, the slip floor will be pulled out from under the load within the truck and the load will be prevented from withdrawing at the same time by means of the preventer beam described or by any other suitable means. When the slip floor has been pulled completely out of the truck which necessitates a longitudinal movement of the conveyor belt 30 sufficient to accomplish this purpose, the rings 76 and 78 are then detached from the hooks 50, the mandrel 66 is repositioned and the slip floor 70 is rewound onto the mandrel by means of the manual winding handle 68 at the end of the mandrel 66. At this time the slip floor is stored at the edge of the loading dock ready for the next truck.

In a modification of the invention, the slip floor 70 can be left in the truck after loading and used to unload the truck when it reaches its destination. In these circumstances, a winch(s) or other suitable power device fixed on the unloading dock or otherwise can be connected with rings 76 and 78 by suitable cables and hooks and the slip floor 70 withdrawn from the truck carrying along with it the load. In this modification the lower surface of the slip floor 70 would have a coefficient of friction as previously described whereas the upper surface would have a coefficient of friction of 0.5 or greater.

Although the present invention has been shown and described in terms of a preferred embodiment, nevertheless various changes and modifications will appear obvious to one skilled in the art which do not depart from the spirit or scope of the present invention. Such changes and modifications are deemed to come within the purview of the present invention.

What is claimed is:

1. Apparatus for loading a truck comprising:
 a loading dock having a loading edge against which a truck can back up to with its truck bed substantially level to the surface of the loading dock,
 an elongated conveyor belt extending over the surface of the loading dock from the loading edge to a point remote from the loading edge and including powered winding means at each end of the conveyor belt to advance and withdraw the conveyor belt to and from the loading edge, the conveyor belt having a width sufficient to support a load to be advanced into a truck directly on the belt, pusher means secured to the conveyor belt to push a load positioned on the conveyor belt toward the loading edge and into the truck, first securing means secured to the conveyor belt, second securing means secured adjacent the loading edge of the dock, constraining means for a load in the truck, and a flexible sheet of preselected frictional characteristics for positioning along the bed of the truck during loading, the sheet being provided with third securing means at one side thereof for selectively attaching to said second securing means during withdrawal of said conveyor belt away from the loading edge to slide said flexible sheet from underneath a load in the truck while the load is constrained by said constraining means to remain in the truck.

2. Apparatus according to claim 1 wherein the first and second securing means include hooks and the third securing means includes rings.

3. Apparatus according to claim 2 wherein the first hooks are fixed to the conveyor belt adjacent the pusher and the second hooks are fixed to the loading edge of the loading dock.

4. Apparatus according to claim 1 wherein a mandrel is provided to roll up the flexible sheet.

5. Apparatus according to claim 4 wherein supports are provided on opposite sides of the conveyor belt adjacent the loading edge to hold the mandrel during roll up of the flexible sheet.

6. Apparatus according to claim 1 wherein the powered winding means are recessed into the surface of the loading dock.

7. Apparatus according to claim 1 wherein the surfaces of the flexible sheet are characterized by a coefficient of friction of not greater than 0.3.

* * * * *